(12) United States Patent
Stephens et al.

(10) Patent No.: US 11,001,540 B2
(45) Date of Patent: May 11, 2021

(54) CAST EXPLOSIVE COMPOSITION

(71) Applicant: BAE SYSTEMS plc, London (GB)

(72) Inventors: Rebecca Elizabeth Stephens, Usk Monmouthshire (GB); Richard Arthur, Porthsmouth (GB); Wayne Cord Hayes, Reading (GB); Michael Budd, Reading (GB)

(73) Assignee: BAE SYSTEMS PLC, London (GB)

( * ) Notice: Subject to any disclaimer, the term of this patent is extended or adjusted under 35 U.S.C. 154(b) by 438 days.

(21) Appl. No.: 15/742,432

(22) PCT Filed: Jul. 6, 2016

(86) PCT No.: PCT/GB2016/052029
§ 371 (c)(1),
(2) Date: Jan. 5, 2018

(87) PCT Pub. No.: WO2017/006110
PCT Pub. Date: Jan. 12, 2017

(65) Prior Publication Data
US 2018/0208521 A1 Jul. 26, 2018

(30) Foreign Application Priority Data

Jul. 7, 2015 (EP) .................................... 15275168
Jul. 7, 2015 (GB) .................................... 1511867
Jan. 26, 2016 (GB) .................................... 1601434

(51) Int. Cl.
*C06B 45/10* (2006.01)
*C06B 21/00* (2006.01)
*B01J 13/14* (2006.01)

(52) U.S. Cl.
CPC .............. *C06B 45/10* (2013.01); *B01J 13/14* (2013.01); *C06B 21/0058* (2013.01)

(58) Field of Classification Search
None
See application file for complete search history.

(56) References Cited

U.S. PATENT DOCUMENTS

| 3,505,428 A | 4/1970 | Kidwell et al. |
| 3,798,090 A | 3/1974 | Allabashi |
| 3,909,497 A | 9/1975 | Hendry et al. |

(Continued)

FOREIGN PATENT DOCUMENTS

| EP | 0152209 A2 | 8/1985 |
| EP | 0780154 A1 | 6/1997 |

(Continued)

OTHER PUBLICATIONS

International Search Report and Written Opinion received for Patent Application No. PCT/GB2016/052029, dated Nov. 8, 2016. 17 pages.

(Continued)

*Primary Examiner* — Aileen B Felton
(74) *Attorney, Agent, or Firm* — Finch & Maloney PLLC

(57) ABSTRACT

The invention relates to a cast explosive composition, particularly to a pre-cure castable explosive composition comprising an explosive material, a polymerisable binder, a microencapsulated cross linking reagent, said microencapsulated cross linking reagent, comprising a cross linking agent encapsulated in a microcapsule.

20 Claims, 3 Drawing Sheets

(56) References Cited

U.S. PATENT DOCUMENTS

| | | | |
|---|---|---|---|
| 4,101,501 | A | 7/1978 | Hinterwaldner |
| 4,263,444 | A | 4/1981 | Graham et al. |
| 4,428,983 | A | 1/1984 | Nehen et al. |
| 4,530,990 | A | 7/1985 | Halpaap et al. |
| 4,803,019 | A | 2/1989 | Graham et al. |
| H778 | H | 5/1990 | Carlton et al. |
| 5,596,232 | A | 1/1997 | Lefumeux |
| 5,747,603 | A | 5/1998 | Hindshaw et al. |
| 5,942,720 | A | 8/1999 | Doll et al. |
| 7,887,651 | B1 | 2/2011 | Mahe |
| 7,955,453 | B1 * | 6/2011 | Kelley ............... C06B 21/0025 149/109.6 |
| 2004/0166077 | A1 | 8/2004 | Toumi et al. |
| 2004/0241485 | A1 | 12/2004 | Kleban et al. |
| 2010/0206418 | A1 * | 8/2010 | Wolf .................... F16L 13/103 138/109 |
| 2011/0168306 | A1 | 7/2011 | Hollands et al. |
| 2013/0196071 | A1 | 8/2013 | Yang et al. |

FOREIGN PATENT DOCUMENTS

| | | | |
|---|---|---|---|
| FR | 2231637 | * | 12/1974 |
| FR | 2231637 A1 | | 12/1974 |
| GB | 1427697 | | 3/1976 |
| JP | 2003119309 A | | 4/2003 |
| JP | 2005213379 | * | 1/2005 |
| WO | 9112883 | | 9/1991 |
| WO | 0013504 A1 | | 3/2000 |
| WO | 0015694 | | 3/2000 |
| WO | 2011126702 A2 | | 10/2011 |
| WO | 2017/006109 A1 | | 1/2017 |
| WO | 2017006110 A1 | | 1/2017 |

OTHER PUBLICATIONS

GB Intellectual Property Office Search Report under Section 17(5) received for GB Patent Application No. 1511867.2 dated Jan. 6, 2016. 4 pages.

GB Intellectual Property Office Search Report under Section 17(5) received for GB Patent Application No. 1601434.2 dated Aug. 17, 2016. 4 pages.

Extended European Search Report received for EP Patent Application No. 15275168.1 dated May 17, 2016. 13 pages.

Partial European Search Report received for EP Patent Application No. 15275168.1 dated Jan. 29, 2016. 9 pages.

Budd, Michael E., "Microencapsulation Approach for use in Delayed Quick-Cure Munitions," University of Reading, MSc in Chemical Research, 2012. 103 pages.

Delebecq, et al., "On the Versatility of Urethane/Urea Bonds: Reversibility, Blocked Isocyanate, and Non-isocyanate Polyurethane," Chemical Reviews, ACS Publications, 2012 American Chemical Society. 40 pages.

International Preliminary Report on Patentability received for Patent Application No. PCT/GB2016/052029, dated Jan. 18, 2018. 12 pages.

Extended European Search Report received for EP Application No. 15275169.9 dated Jan. 25, 2016. 9 pages.

GB Intellectual Property Office Search Report under Section 17(5) received for GB Patent Application No. 1511869.8 dated Jan. 6, 2016. 3 pages.

GB Intellectual Property Office Search Report under Section 17(5) received for GB Patent Application No. 1601433.4 dated Aug. 17, 2016. 3 pages.

International Preliminary Report on Patentability received for Patent Application No. PCT/GB2016/052028, dated Jan. 9, 2018. 7 pages.

International Preliminary Report on Patentability received for Patent Application No. PCT/GB2016/052028, dated Jan. 18, 2018. 8 pages.

International Search Report and Written Opinion received for Patent Application No. PCT/GB2016/052028, dated Sep. 27, 2016. 10 pages.

Wicks, et al., "Blocked isocyanates III: Part A. Mechanisms and chemistry," ELSEVIER, Progress in Organic Coatings 36 (1999), pp. 148-172.

Wicks, Zeno W., Jr., "Blocked Isocyantes," Elsevier Sequoia S.A., Lausanne, Progress in Organic Coatings 3 (1975), pp. 73-99.

Office Action, U.S. Appl. No. 15/746,980 (dated Mar. 12, 2021).

* cited by examiner

CAST EXPLOSIVE COMPOSITION

This invention relates to cast explosive compositions, their preparation and use. In particular, the invention relates to polymer-bonded explosive compositions.

Explosives compositions are generally shaped, the shape required depending upon the purpose intended. Shaping can be by casting, pressing, extruding or moulding; casting and pressing being the most common shaping techniques. However, it is generally desirable to cast explosives compositions as casting offers a greater design flexibility than pressing.

Polymer-bonded explosives (also known as plastic-bonded explosives and PBX) are typically explosive powders bound into a polymer matrix. The presence of the matrix modifies the physical and chemical properties of the explosive and often facilitates the casting and curing of high melting point explosives. Such explosives could otherwise only be cast using melt-casting techniques. Melt casting techniques can require high processing temperatures as they generally include a meltable binder. The higher the melting point of this binder, the greater the potential hazard. In addition, the matrix can be used to prepare polymer-bonded explosives which are less sensitive to friction, impact and heat; for instance, an elastomeric matrix could provide these properties.

The matrix also facilitates the fabrication of explosive charges which are less vulnerable in terms of their response to impact, shock, thermal and other hazardous stimuli. Alternatively, a rigid polymer matrix could allow the resulting polymer-bonded explosive to be shaped by machining, for instance using a lathe, allowing the production of explosive materials with complex configurations where necessary.

Conventional casting techniques require the polymerisation step to have commenced during the fill stage which often results in a solidified composition which retains air bubbles introduced during mixing of the material, non-homogenous cross linking, and in certain cases solidification of the "pot" of explosive before all munitions or moulds have been filled . . . . These voids, non-homogenous cross linking can reduce the performance of the composition as less explosive is present per unit volume. In addition, these defects may affect the shock sensitivity of the composition, making the composition less stable to impact or ignition from a shock wave.

The invention seeks to provide a cast explosive composition in which the stability of the composition is improved. Such a composition would not only offer improved stability, but also a reduced sensitivity to factors such as friction, impact and heat. Thus, the risk of inadvertent initiation of the explosive is diminished.

According to a first aspect of the invention there is provided a pre-cure castable explosive composition comprising an explosive material, a polymerisable binder, a microencapsulated cross linking reagent, which comprises a cross linking reagent encapsulated in a microcapsule.

Current processes used in the production of composite rubber materials involve mixing a hydroxy-terminated aliphatic polymer with a cross linking reagent. Upon addition, an immediate polymerisation reaction occurs, leading to the formation of an inhomogeneous crosslinked rubber matrix. Formation of an inhomogeneous matrix leads to material being rejected or the mixture fully polymerising before all munitions or moulds have been filled. This leads to the rejected material requiring disposal, a process that has both cost and hazard associated.

Confining the cross linking reagent within microcapsules allows uniform distribution of the microcapsule encapsulated cross linking reagent within the pre-cure composition, thereby allowing control of when the curing reaction may be initiated. Upon application of a stimulus, the microcapsule contents may be released allowing the formation of a uniform polymeric matrix, when desired.

The enhanced control of the cross linking reactions allows the recovery of the pre-cure composition in the event of process equipment failure, which in a conventional cure technique would result in many tonnes of material solidifying in the reaction vessel. Further the delay of the cure reaction allows product quality to be confirmed, before the reaction commences, thereby a poor quality composition, is not filled into moulds or munitions. The confinement of the cross linking reagent within a microcapsule may reduce the exposure to operators of hazardous cross linking reagents.

Polymer-bonded explosives include a polymeric polymerisable binder which forms a matrix bonding explosive particles within. The polymerisable binder thus may be selected from a wide range of polymers, depending upon the application in which the explosive will be used. However, in general at least a portion of the polymerisable binder will be selected such that when cross linked, with a cross linking reagent, to form polyurethanes, cellulosic materials such as cellulose acetate, polyesters, polybutadienes, polyethylenes, polyisobutylenes, PVA, chlorinated rubber, epoxy resins, two-pack polyurethane systems, alkyd/melanine, vinyl resins, alkyds, thermoplastic elastomers such as butadiene-styrene block copolymers, and blends, copolymers and/or combinations thereof.

Energetic polymers may also be used either alone or in combination, these include polyNIMMO (poly(3-nitratomethyl-3-methyloxetane), polyGLYN (poly glycidyl nitrate) and GAP (glycidyl azide polymer). It is preferred that the binder component be entirely selected from the list of binders above either alone or in combination.

In some embodiments the polymerisable binder will comprise at least partly polyurethane, often the polymerisable binder will comprise 50-100 wt % polyurethane, in some instances, 80-100 wt %. In some embodiments the polymerisable binder will consist of polyurethane.

The cross linking reagents may be selected from a variety of commonly known, cross linking reagents, the selection of which depends on the functionality of the polymerisable binders.

Polyurethanes are a highly preferred polymerisable binder for PBX formation. The polyurethanes may typically be prepared by reacting polyols and polyisocyanates. In a preferred arrangement a monomer or polymer diol may be crosslinked with a cross linking reagent such as diisocyanate. The diisocyanate may be such as, for example, MDI (methylene diphenyl diisocyanate) and TDI (toluene diisocyanate) and IPDI (isophorone diisocyanate). IPDI is generally preferred as it is a liquid and hence easy to dispense; it is relatively slow to react, providing a long pot-life and slower temperature changes during reaction; and it has a relatively low toxicity compared to most other isocyanates. It is also preferred that, where the polymerisable binder comprises polyurethane, the polyurethane polymerisable binder includes a hydroxyterminated polybutadiene. The polyisocyanate may be dissolved in a minimal aliquot of solvent.

The cross linking reagent may be protected with a functional protecting group, such that during encapsulation the cross linking reagent does not react or degrade. The blocked cross linking reagent may be that as defined in Applicant's co-filed Application GB1511869.8, incorporated by reference herein.

The explosive component of the polymer-bonded explosive may, in certain embodiments, comprise one or more heteroalicyclic nitramine compounds. Nitramine compounds are those containing at least one N—NO$_2$ group. Heteroalicyclic nitramines bear a ring containing N—NO$_2$ groups. Such ring or rings may contain for example from two to ten carbon atoms and from two to ten ring nitrogen atoms. Examples of preferred heteroalicyclic nitramines are RDX (cyclo-1,2,3-trimethylene-2,4,6-trinitramine, Hexogen), HMX (cyclo-1,3,5,7-tetramethylene-2,4,6,8-tetranitramine, Octogen), and mixtures thereof. The explosive component may additionally or alternatively be selected from TATND (tetranitro-tetraminodecalin), HNS (hexanitrostilbene), TATB (triaminotrinitrobenzene), NTO (3-nitro-1,2,4-triazol-5-one), HNIW (2,4,6,8,10,12-hexanitro-hexaazaisowurtzitane), GUDN (guanyldylurea dinitride), FOX-7 (1,1-diamino-2, 2-dinitroethene), and combinations thereof.

Other highly energetic materials may be used in place of or in addition to the compounds specified above. Examples of other suitable known highly energetic materials include picrite (nitroguanidine), aromatic nitramines such as tetryl, ethylene dinitramine, and nitrate esters such as nitroglycerine (glycerol trinitrate), butane triol trinitrate or pentaerythritol tetranitrate, DNAN (dinitroanisole), trinitrotoluene (TNT), inorganic oxidisers such as ammonium salts, for instance, ammonium nitrate, ammonium dinitramide (ADN) or ammonium perchlorate, and energetic alkali metal and alkaline earth metal salts.

The microcapsule may comprise at least one cross linking reagent or at least two independently selected cross linking reagents. The microcapsule may comprise a solvent, or other processing aids. In a preferred arrangement the microcapsule contains only a cross linking reagent, and a substantial absence of solvent.

The microcapsule may have a wall thickness in the range of from 0.5 microns to 5 microns, more preferably 0.9 microns to 4.5 microns, preferably in the range of from 2 microns to 4 microns.

The microcapsule may have a diameter in the range of from 1 micron to 1000 microns, preferably in the range of from 20-500 microns.

The microcapsule may comprise at least one shell wall polymer, selected from polyurethane, cellulosic materials such as cellulose acetate, polyesters, polybutadienes, polyethylenes, polyisobutylenes, PVA, chlorinated rubber, epoxy resins, two-pack polyurethane systems, alkyd/melanine, vinyl resins, alkyds, butadiene-styrene block copolymers, polyNIMMO, polyGLYN, GAP, and blends, copolymers and/or combinations thereof.

The microcapsule wall polymer may preferably comprise nitro groups, to provide increased exothermic energy to the explosive composition.

In a preferred arrangement the microcapsule wall polymer and polymerisable binder (that is used to from the polymer bonded explosive) may be selected from substantially the same polymer class, such that both may be a polyurethane, or a polyester etc. This reduced the likelihood of incompatibility with the explosive material.

The polymer backbone (repeat unit) for the polymerisable binder and the wall polymer of the microcapsule may be independently selected.

The microcapsule shell wall polymer that forms the microcapsule may comprise at least one labile linkage. The labile linkage may allow a more facile rupture of the microcapsule, when at least one chemical stimulus and/or physical stimulus, is applied. The ruptured microcapsule will then allow the encapsulated contents to be released, when exposed to a specific stimulus.

The stimulus may be one or more of, such as, for example, pressure, heat, ultrasound, UV radiation, catalyst, or a shear force.

In a preferred arrangement the labile linkage is a thermally labile linkage, one that ruptures when subjected to elevated temperatures. The linkage may be selected from, acetals, blocked isocyanates, diels alder linkages.

For PBX formulations it has been found that the selection of blocked isocyanates as the labile linkage group in the microcapsule shell wall polymer provide robust microcapsules, which can withstand the mixing, processing and handling during production of an explosive composition. Furthermore blocked isocyanates may be selected to provide de-blocking and hence rupture temperatures in a range that occurs below the temperature of initiation of high explosive materials and a de-blocking temperature that is above the temperatures that are generated during the mixing of the pre-cure reagents.

Thereby, there is a specific stimulus of heat which must be applied to the pre-cure to cause the rupture of the microcapsule walls, and thereby allow the release of the encapsulated cross linking reagent, such that the formation of the PBX may be realised.

The blocked isocyanate labile linkages may be selected from aromatic heterocycles, secondary amines, substituted phenols, oximes and amides.

Formula X

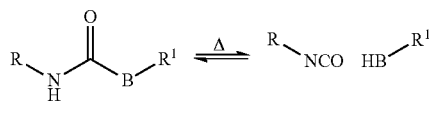

| Blocking Group | Deblocking Temperature Range (° C.) |
|---|---|
| 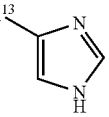<br>i) Aromatic heterocycles | 110-160 |
| <br>ii) Amines | 40-130 |
| 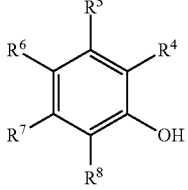<br>iii) Phenols | 75-180 |

| Blocking Group | Deblocking Temperature Range (° C.) |
|---|---|
| 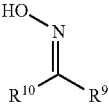<br>iv) Oximes | 100-140 |
| 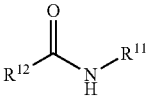<br>v) Amides | 100-157 |

B is a Blocking group, preferably selected from aromatic heterocycles, sterically hindered secondary amines, substituted phenols, oximes and amides. Preferably the Blocking group B comprises at least one nitro group, more preferably at least two nitro groups, to provide increased exothermic energy to the explosive composition.

In a preferred arrangement, R and $R^1$ are terminal end groups of a shell wall (monomer or polymer) precursor that forms the backbone i.e. the shell wall polymer of the microcapsule wall.

$R^2$-$R^6$ may be selected from halo, nitro, lower chain $C_{1-6}$ alkyl, and aryl. In a preferred arrangement the substituted phenol comprises at least two nitro groups.

$R^2$, $R^3$ and $R^9$ to $R^{13}$ may be selected from, nitro, lower chain $C_{1-6}$ alkyl, $C_{1-6}$ alkenyl, branched chain $C_{1-8}$ alkyl, alkenyl, preferably isopropyl or tert-butyl.

It has been found that for blocking groups B an increase in steric hindrance of the group reduces the deblocking temperature, i.e. the reverse reaction to the free isocyanate.

B may be
I. $NHR^2R^3$, wherein $R^2$ and $R^3$ are alkyl, alkenyl, branched chain alkyl; aryl, phenyl or together form a heterocycle
II. $R^{11}NC(O)R^{12}$, wherein $R^{11}$ and $R^{12}$ are alkyl, alkenyl, branched chain alkyl; aryl, phenyl or together form a lactam.
III. $OR^{15}$, $O-N=CR^9R^{10}$
   wherein $R^{15}$ is aryl, phenyl, benzyl, preferably, at least two nitro group on the ring;
   wherein $R^9$ and $R^{16}$ are independently selected from alkyl, alkenyl, branched chain alkyl, aryl, phenyl, preferably provided that at least one of $R^9$ or $R^{16}$ is a branched chain alkyl or aryl, or phenyl.

During the formation of the microcapsule wall polymer the $R^1$—BH and R—NCO may react to form a blocked isocyante group, such that reaction forms a thermally labile linkage, and thereby forms part of the wall polymer of the microcapsule. Whereupon the complete formation of a microcapsule wall, it may be capable of encapsulating a cross linking reagent.

In a highly preferred arrangement the thermal release of microcapsules may be in the range of from 50° C. to 150° C., more preferably in the range of from 80° C. to 120° C., such that the release occurs above current processing temperatures and well below the ignition temperature of the explosive.

The microcapsule may comprise wall polymers that have substantially no labile linkages and wall polymers that have at least one labile linkage.

According to a further aspect of the invention there is provided a process for filling a munition with a homogenous cross linked polymer bonded explosive composition comprising the steps of:
i) forming an admixture of pre-cure castable explosive composition, said composition comprising an explosive material, a polymerisable binder, a microencapsulated cross linking reagent, which comprises a cross linking reagent encapsulated in a microcapsule;
ii) filling the munition
iii) causing the microcapsule to release said cross linking reagent, optionally
iv) causing the cure of said polymerisable binder to form a polymer bonded cast explosive composition.

In an alternative arrangement the step of
iii) causing the microcapsule to release said cross linking reagent may be caused immediately prior to filling the shell.

The delaying the onset of cross linking of the polymerisable binder ensures that extensive mixing is achieved prior to cross linking reaction, which is required to ensure homogeneous mixture. In conventional methods the cross linking reagent is free and so at the point of mixing the cross linking reaction with the polymer is already in progress. In the process defined herein the extensive mixing may be performed before the microcapsule is ruptured and the concomitant reaction of the cross linking reagent and polymerisable binder occurs.

According to a further aspect of the invention there is provided a process for filling a munition with a homogenous cross linked polymer bonded explosive composition comprising the steps of:
i) forming an admixture of pre-cure castable explosive composition, said composition comprising an explosive material, a polymerisable binder, a microencapsulated cross linking reagent, which comprises a cross linking reagent encapsulated in a microcapsule;
ii) causing the microcapsule to release said cross linking reagent,
iii) causing the cure of said polymerisable binder to form a polymer bonded cast explosive composition.

Further reagents or further stimuli may be added to the composition to cause the curing reaction to commence, after the cross linking reagent has been released from the microcapsule. In a highly preferred arrangement, the curing reaction will commence directly as a result of causing the microcapsule to release said cross linking reagent.

The step of causing the microcapsule to release said cross linking reagent, may be provided by applying at least one chemical stimulus and/or physical stimulus, to cause rupture of the microcapsule wall. The stimulus may be one or more of heat, ultrasound, UV radiation, catalyst and shear force.

According to a further aspect of the invention there is provided a cured explosive product comprising a polymer bonded explosive composition and ruptured microcapsules, preferably there is provided a munition comprising a cured polymer bonded explosive composition and ruptured microcapsules.

The explosive component of the polymer-bonded explosive may be in an admixture with a metal powder which may function as a fuel or which may be included to achieve a specific terminal effect. The metal powder may be selected from a wide range of metals including aluminium, magnesium, tungsten, alloys of these metals and combinations thereof. Often the fuel will be aluminium or an alloy thereof; often the fuel will be aluminium powder.

In some embodiments, the polymer-bonded explosive comprises RDX. The polymer-bonded explosive may comprise RDX as the only explosive component, or in combination with a secondary explosive component, such as HMX. Preferably, RDX comprises 50-100 wt % of the explosive component.

In many cases the polymerisable binder will be present in the range about 5-20 wt % of the polymer-bonded explosive, often about 5-15 wt %, or about 8-12 wt %. The polymer-bonded explosive may comprise about 88 wt % RDX and about 12 wt % polyurethane binder. However, the relative levels of RDX to polyurethane binder may be in the range about 75-95 wt % RDX and 5-25 wt % polyurethane binder. Polymer-bonded explosives of this composition are commercially available, for example, Rowanex 1100™.

Many defoaming agents are known and in general any defoaming agent or combination thereof which does not chemically react with the explosive may be used. However, often the defoaming agent will be a polysiloxane. In many embodiments, the polysiloxane is selected from polyalkyl siloxanes, polyalkylaryl siloxanes, polyether siloxane co-polymers, and combinations thereof. It is often preferred that the polysiloxane be a polyalkylsiloxane; polydimethylsiloxane may typically be used. Alternatively, the defoaming agent may be a combination of silicone-free surface active polymers, or a combination of these with a polysiloxane. Such silicone-free polymers include alkoxylated alcohols, triisobutyl phosphate, and fumed silica. Commercially available products which may be used include, BYK 088, BYK A500, BYK 066N and BYK A535 each available from BYK Additives and Instruments, a subdivision of Altana; TEGO MR2132 available from Evonik; and BASF SD23 and SD40, both available from BASF. Of these, BYK A535 and TEGO MR2132 are often used as they are solventless products with good void reduction properties.

Often the defoaming agent is present in the range about 0.01-2 wt %, in some instances about 0.03-1.5 wt %, often about 0.05-1 wt %, in many cases about 0.25 or 0.5-1 wt %. At levels below this (i.e. below 0.01 wt %) there is often insufficient defoaming agent in the composition to significantly alter the properties of the polymer-bonded explosive, whereas above this level (i.e. above 2 wt %) the viscosity of the cast solution may be so low that the composition becomes inhomogeneous as a result of sedimentation and segregation processes occurring within the mixture.

The explosive composition may include a solvent, any solvent in which at least one of the components is soluble and which does not adversely affect the safety of the final product may be used, as would be understood by the person skilled in the art. However, it is preferred, for the reasons described above, that in some embodiments that solvent be absent.

Where present, the solvent may be added as a carrier for the components of the composition. The solvent will typically be removed from the explosive composition during the casting process, however some solvent residue may remain due to imperfections in the processing techniques or where it becomes uneconomical to remove the remaining solvent from the composition. Often the solvent will be selected from diisobutylketone, polypropylene glycol, isoparaffins, propylene glycol, cyclohexanone, butyl glycol, ethylhexanol, white spirit, isoparaffins, xylene, methoxypropylacetate, butylacetate, naphthenes, glycolic acid butyl ester, alkyl benzenes and combinations thereof. In some instances, the solvent is selected from diisobutylketone, polypropylene glycol, isoparaffins, propylene glycol, isoparaffins, and combinations thereof.

The composition may also contain minor amounts of other additives commonly used in explosives compositions. Examples of these include microcrystalline wax, energetic plasticisers, non-energetic plasticisers, anti-oxidants, catalysts, curing agents, metallic fuels, coupling agents, surfactants, dyes and combinations thereof. Energetic plasticisers may be selected from eutectic mixtures of alkylnitrobenzenes (such as dinitro- and trinitro-ethyl benzene), alkyl derivatives of linear nitramines (such as an N-alkyl nitrato-ethyl-nitramine, for instance butyl-NENA), and glycidyl azide oligomers.

Casting the explosive composition offers a greater flexibility of process design than can be obtained with pressing techniques. This is because the casting of different shapes can be facilitated through the simple substitution of one casting mould for another. In other words, the casting process is backwards-compatible with earlier processing apparatus. Conversely, where a change of product shape is required using pressing techniques, it is typically necessary to redesign a substantial portion of the production apparatus for compatibility with the mould, or the munition to be filled, leading to time and costs penalties. Further, casting techniques are less limited by size than pressing techniques which depend upon the transmission of pressure through the moulding powder to cause compaction. This pressure falls off rapidly with distance, making homogeneous charges with large length to diameter ratios (such as many shell fillings) more difficult to manufacture.

In addition, the casting process of the invention offers a moulded product (the cast explosive compositions described) with a reliably uniform fill regardless of the shape required by the casting. This may be partly attributed to the use of a delayed curing technique. Casting can occur in situ with the housing (such as a munition) to be filled acting as the mould; or the composition can be moulded and transferred into a housing in a separate step. Often casting will occur in situ.

Further, compositions including polymer-bonded explosives and hydroxyterminated polybutadiene binders in particular, are more elastomeric when cast than when pressed. This makes them less prone to undergoing a deflagration-to-detonation transition when exposed to accidental stimuli. Instead, such systems burn without detonating, making them safer to use than pressed systems.

Additionally, the shapes that pressing processes can be reliably applied to are more limited. For instance, it is often a problem achieving a complete fill of a conical shape using pressing techniques as air is often trapped at or towards the tip of the cone. Casting processes, being intrinsically "fluid" processes, are not limited in this way.

In some instances the explosive component is desensitized with water prior to formation of the premix, a process known as wetting or phlegmatization. However, as retention of water within the pre-cure is generally undesirable it will typically be removed from the premix prior to further processing, for instance by heating during the mixing of the explosive component and the plasticiser.

In some cases the plasticiser will be absent; however the plasticiser will typically be present in the range 0-10 wt % of the plasticiser and explosive premix, often in the range 0.01-8 wt %, on occasion 0.5-7 wt % or 4-6 wt %. The plasticiser will often be a non-energetic plasticiser, many are known in the art; however energetic plasticisers may also be used in some instances. The cast explosive composition of the invention has utility both as a main charge or a booster charge in an explosive product. Often the composition will be the main charge. The composition of the invention may be used in any "energetic" application such as, for example, uses include mortar bombs and artillery shells as discussed above. Additionally, the inventive composition may be used to prepare explosives for gun-launch applications, explosive filings for bombs and warheads, propellants, including composite propellants, base bleed compositions, gun propellants and gas generators.

Except in the examples, or where otherwise explicitly indicated, all numbers in this description indicating amounts of material or conditions of reaction, physical properties of materials and/or use are to be understood as modified by the word "about." All amounts are by weight of the final composition, unless otherwise specified. Further, the cast explosive composition may comprise, consist essentially of, or consist of any of the possible combinations of components described above and in the claims except for where otherwise specifically indicated.

According to a further aspect of the invention there is provided an organic microcapsule shell suitable for encapsulating an organic payload reagent, wherein the microcapsule shell comprises a shell wall polymer and at least one thermally labile linkage, wherein the thermally labile linkage comprises a blocked isocyanate Formula X

wherein R and $R^1$ are terminal end groups of a monomer or polymer forming the backbone of the microcapsule wall B is a reversible blocking group selected from an amide or phenol.

The organic payload reagent is the moiety to be released from the microcapsule, and may be any organic molecule soluble in organic solvents. The payload reagent may be, such as for example, dyes, catalysts, pharmaceutical, agrochemical, cross linking reagents (hardeners), and aroma compounds.

The shell wall polymer types may be selected from polyurethanes, polyurea, polyamide or polyester.

The following non-limiting examples illustrate the invention.

EXAMPLES

A microcapsule's shell wall polymer are typically formed by the reaction between a shell wall precursor and a chain extender. The two units form the shell wall polymer and are selected such that they form a complete microcapsule, which is capable of encapsulating further reagents.

General Procedure for the Synthesis of Microcapsules with Encapsulated IPDI

Gum arabic (surfactant to stablise oil droplets to aid the formation of the emulsion) was dissolved in deionised $H_2O$ (60 mL) and agitated with mechanical stirring. The shell wall precursor was dissolved in 1,2-dichlorobenzene and Isophorone diisocyanate (the to be encapsulated cross linking reagent). This solution was then added in a dropwise fashion to the aqueous solution and the mixture heated to a temperature of 50° C. whilst stirring at a rate of 1000 rpm, chain extender (such as 1,4-Butanediol) was then added and the mixture heated to a temperature of 70° C. and stirred at 150 rpm for 2 hours and 45 minutes. The microcapsules are thus produced by the reaction of the shell wall precursor and the chain extender, which were filtered and washed with water and allowed to air dry.

To provide a robust microcapsule it may be preferable to provide a microcapsule wall with at least one non-labile shell wall polymer and at least one labile shell wall polymer.

Synthesis of Non-Labile Shell Wall Precursor

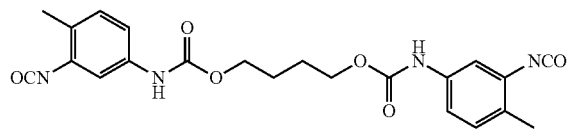

XII

Toluene-2,4-diisocyanate (6.07 g, 35 mmol) was dissolved in cyclohexanone (19 mL). 1,4-Butanediol (9.15 g, 10 mmol) was added and the solution stirred for a period of 18 hours at 80° C. under argon, to form the shell wall precursor XII. Cyclohexanone and excess toluene-2,4-diisocyanate were then removed by vacuum distillation (100° C., 1 mmHg) over a period of 4 hours to leave a viscous yellow oil (7) (4.24 g, 97%).

Synthesis of Non-Labile Microcapsules Containing IPDI

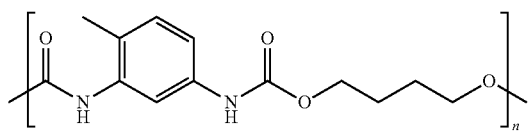

XXIV

Gum arabic (9 g) was dissolved in deionised $H_2O$ (60 mL) and agitated at a rate of 1000 rpm. The shell wall precursor XII (0.350 g, 0.8 mmol) was dissolved in chlorobenzene (0.9 mL) and isophorone diisocyanate (1.0 g, 4.5 mmol) (cross linking reagent). This solution was then added in a dropwise fashion to the aqueous solution and the mixture heated to a temperature of 50° C. whilst stirring at a rate of 1000 rpm, 1,4-Butanediol (5.2 g, 57.8 mmol) was then added and the mixture heated to a temperature of 70° C. and stirred at 150 rpm for 2 hours and 45 minutes. The microcapsules XXIV thus produced were filtered and washed with water and allowed to air dry.

The encapsulated composition was 48 wt % IPDI, 24 wt % as confirmed by $^1H$ NMR spectroscopy and thermogravimetric analysis.

Examples of Thermally Labile Linkages for Polymer Shell Precursors

The below examples are example linkages that have been synthesised to allow a study of the thermally labile linkages, which when incorporated into a microcapsule furnishes a thermally labile linkage. The terminal isocyanates may be reacted to form polyurethane microcapsule shell wall precursors, and may be transformed into microcapsules, as outlined above.

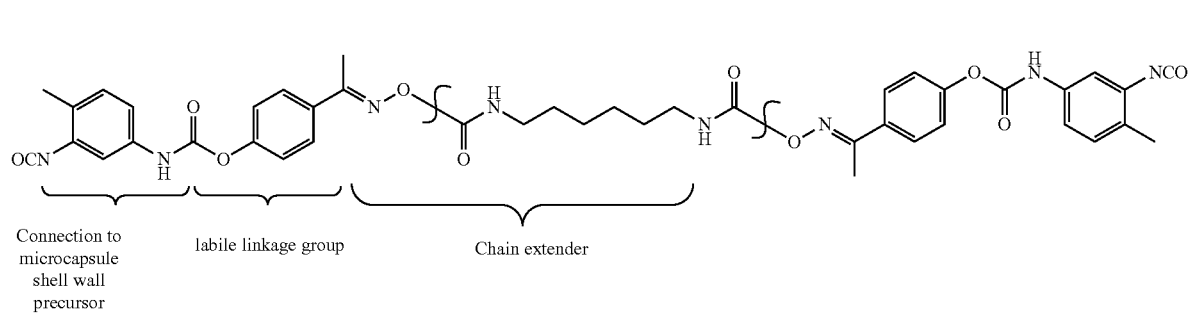
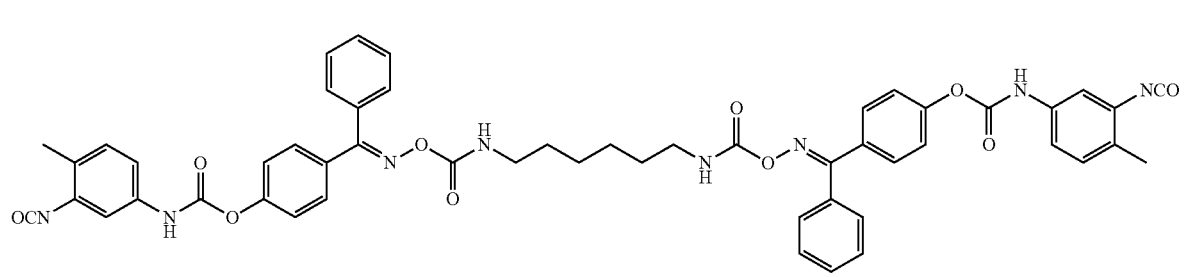
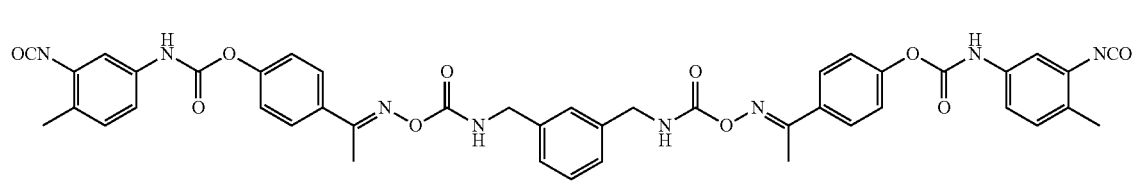
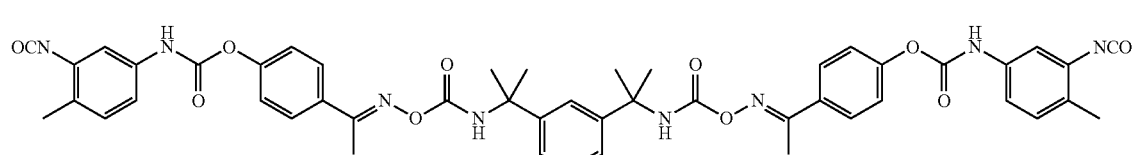
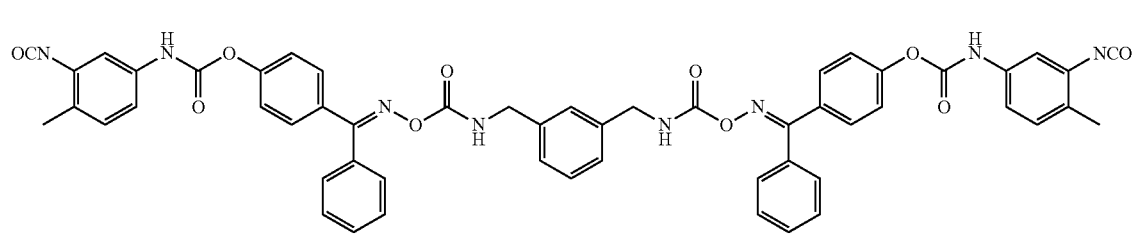
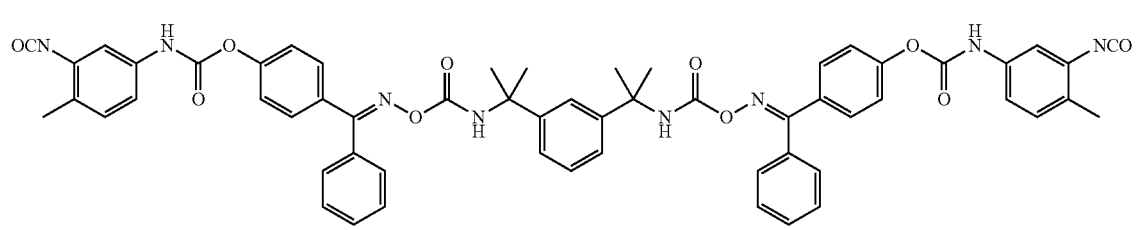
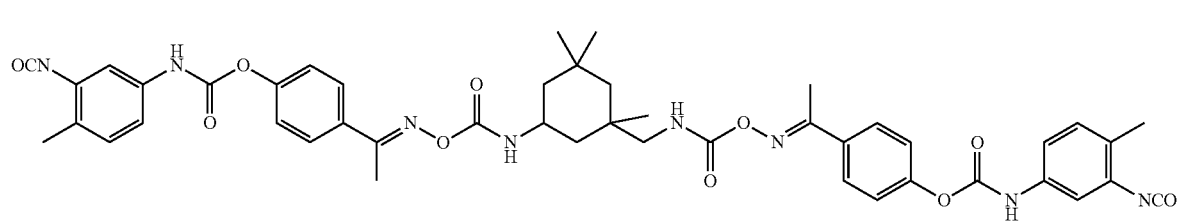

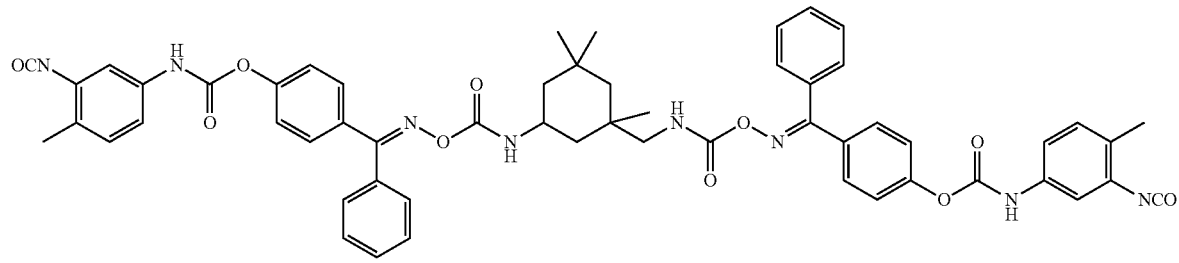
VIII
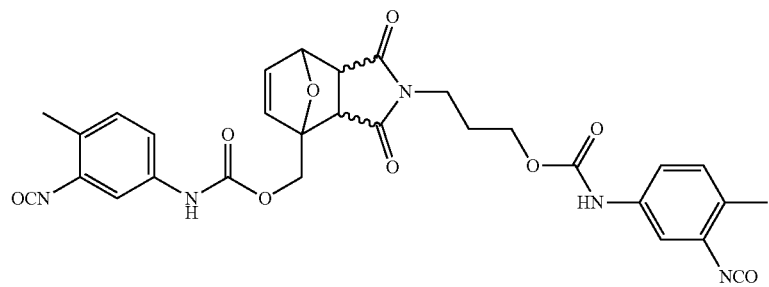
IX
In a particularly preferred arrangement the chain extender may be selected as a blocked IPDI moiety, (such as, for example as shown in compound VIII) such that when the thermally labile linkage is released, IPDI may be released as a product of the polymer breakdown.
Synthesis of Microcapsules with Labile Linkage
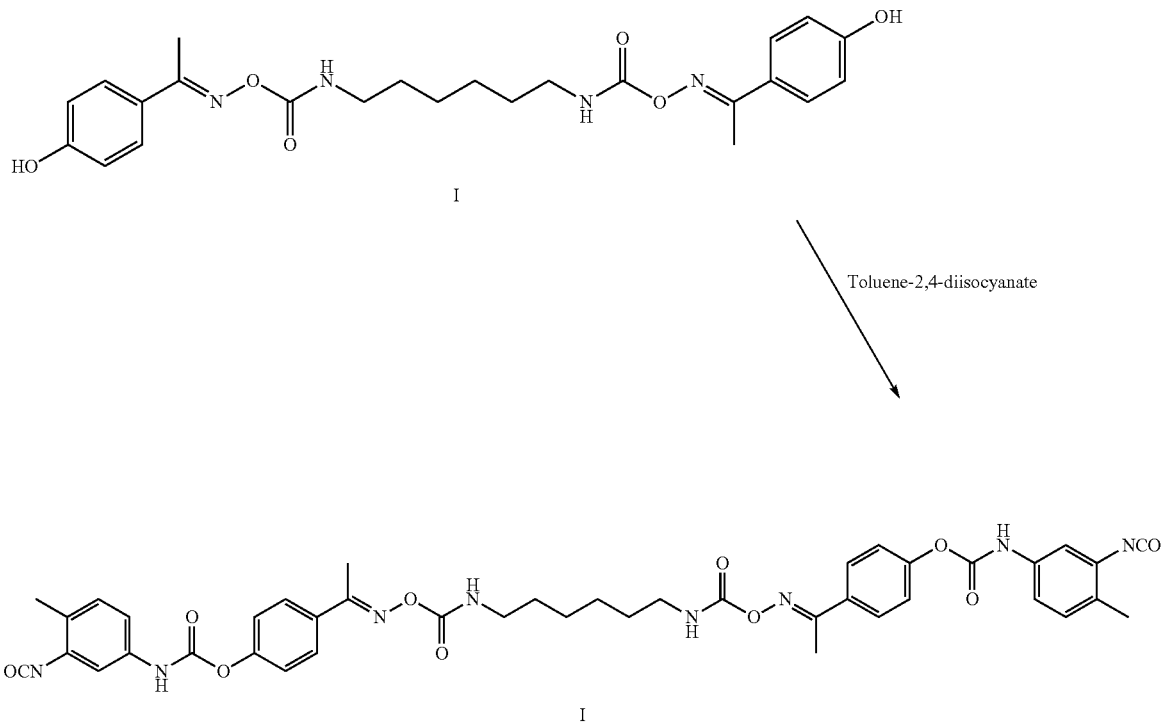
I
Toluene-2,4-diisocyanate
I The labile linkage shell wall precursor I was prepared under the same conditions as the non-labile precursor by the reaction of the diol with toluene-2,4-diisocyanate.

Gum arabic (9 g) was dissolved in deionised $H_2O$ (60 mL) and agitated at a rate of 1000 rpm. The shell wall precursor I (containing the labile linkage) (0.900 g, 1.1 mmol) was dissolved in 1,2-dichlorobenzene (0.8 mL) and IPDI (0.800 g, 3.6 mmol). This solution was then added in a dropwise fashion to the aqueous solution and the mixture heated to a temperature of 50° C. whilst stirring at a rate of 1000 rpm, 1,4-Butanediol as a chain extender (5.2 g, 57.8 mmol) was then added and the mixture heated to a temperature of 70° C. and stirred at 150 rpm for 2 hours and 45 minutes. The microcapsules thus produced were filtered and washed with water and allowed to air dry.

In the labile linkage microcapsules, the shell wall precursors, such as for example I-VIII are preferably prepared and isolated before adding the chain extender to furnish the polymerised microcapsule product.

Table of Formation of Microcapsule Conditions
Shell Wall Precursor

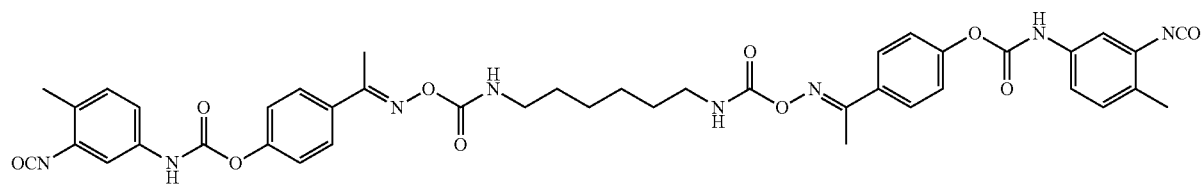

I

Chain Extender 1,4-Butanediol
Encapsulant-IPDI

TABLE 1

| Experiment Number | Agitation rate | Shell wall precursor conc. (wt %) | Chain extender conc. (wt %) | Solvent | Encapsulant concentration (wt %) | Surfactant conc. (wt %) | Reaction temperature (° C.) | Reaction time (minutes) |
|---|---|---|---|---|---|---|---|---|
| 1 | 500 | 18.0 | 8.3 | Chlorobenzene | 82.0 | 15.0 | 70 | 165 |
| 2 | 750 | 18.0 | 8.3 | Chlorobenzene | 82.0 | 15.0 | 70 | 165 |
| 3 | 1000 | 18.0 | 8.3 | Chlorobenzene | 82.0 | 15.0 | 70 | 165 |
| 4 | 1250 | 18.0 | 8.3 | Chlorobenzene | 82.0 | 15.0 | 70 | 165 |
| 5 | 1500 | 18.0 | 8.3 | Chlorobenzene | 82.0 | 15.0 | 70 | 165 |
| 6 | 1750 | 18.0 | 8.3 | Chlorobenzene | 82.0 | 15.0 | 70 | 165 |
| 7 | 2000 | 18.0 | 8.3 | Chlorobenzene | 82.0 | 15.0 | 70 | 165 |
| 8 | 1000 | 13.0 | 8.3 | Chlorobenzene | 82.0 | 15.0 | 70 | 165 |
| 9 | 1000 | 23.0 | 8.3 | Chlorobenzene | 82.0 | 15.0 | 70 | 165 |
| 10 | 1000 | 35.0 | 8.3 | Chlorobenzene | 82.0 | 15.0 | 70 | 165 |
| 11 | 1000 | 52.0 | 8.3 | Chlorobenzene | 82.0 | 15.0 | 70 | 165 |
| 12 | 1000 | 68.0 | 8.3 | Chlorobenzene | 82.0 | 15.0 | 70 | 165 |
| 13 | 1000 | 18.0 | 0.6 | Chlorobenzene | 82.0 | 15.0 | 70 | 165 |
| 14 | 1000 | 18.0 | 2.5 | Chlorobenzene | 82.0 | 15.0 | 70 | 165 |
| 15 | 1000 | 18.0 | 5.8 | Chlorobenzene | 82.0 | 15.0 | 70 | 165 |
| 16 | 1000 | 18.0 | 10.3 | Chlorobenzene | 82.0 | 15.0 | 70 | 165 |
| 17 | 1000 | 18.0 | 8.3 | Dichlorobenzene | 82.0 | 15.0 | 70 | 165 |
| 18 | 1000 | 18.0 | 8.3 | Trichlorobenzene | 82.0 | 15.0 | 70 | 165 |
| 19 | 1000 | 18.0 | 8.3 | Phenyl acetate | 82.0 | 15.0 | 70 | 165 |
| 20 | 1000 | 18.0 | 8.3 | Ethyl phenylacetate | 82.0 | 15.0 | 70 | 165 |
| 21 | 1000 | 18.0 | 8.3 | Chlorobenzene | 0.0 | 15.0 | 70 | 165 |
| 22 | 1000 | 18.0 | 8.3 | Chlorobenzene | 11.0 | 15.0 | 70 | 165 |
| 23 | 1000 | 18.0 | 8.3 | Chlorobenzene | 26.0 | 15.0 | 70 | 165 |
| 24 | 1000 | 18.0 | 8.3 | Chlorobenzene | 42.0 | 15.0 | 70 | 165 |
| 25 | 1000 | 18.0 | 8.3 | Chlorobenzene | 53.0 | 15.0 | 70 | 165 |
| 26 | 1000 | 18.0 | 8.3 | Chlorobenzene | 63.0 | 15.0 | 70 | 165 |
| 27 | 1000 | 18.0 | 8.3 | Chlorobenzene | 79.0 | 15.0 | 70 | 165 |
| 28 | 1000 | 18.0 | 8.3 | Chlorobenzene | 89.0 | 15.0 | 70 | 165 |
| 29 | 1000 | 18.0 | 8.3 | Chlorobenzene | 100.0 | 15.0 | 70 | 165 |
| 30 | 1000 | 18.0 | 8.3 | Chlorobenzene | 82.0 | 5.0 | 70 | 165 |
| 31 | 1000 | 18.0 | 8.3 | Chlorobenzene | 82.0 | 10.0 | 70 | 165 |
| 32 | 1000 | 18.0 | 8.3 | Chlorobenzene | 82.0 | 20.0 | 70 | 165 |
| 33 | 1000 | 18.0 | 8.3 | Chlorobenzene | 82.0 | 25.0 | 70 | 165 |
| 34 | 1000 | 18.0 | 8.3 | Chlorobenzene | 82.0 | 15.0 | 40 | 165 |
| 35 | 1000 | 18.0 | 8.3 | Chlorobenzene | 82.0 | 15.0 | 50 | 165 |
| 36 | 1000 | 18.0 | 8.3 | Chlorobenzene | 82.0 | 15.0 | 60 | 165 |
| 37 | 1000 | 18.0 | 8.3 | Chlorobenzene | 82.0 | 15.0 | 80 | 165 |
| 38 | 1000 | 18.0 | 8.3 | Chlorobenzene | 82.0 | 15.0 | 70 | 45 |
| 39 | 1000 | 18.0 | 8.3 | Chlorobenzene | 82.0 | 15.0 | 70 | 75 |
| 40 | 1000 | 18.0 | 8.3 | Chlorobenzene | 82.0 | 15.0 | 70 | 105 |
| 41 | 1000 | 18.0 | 8.3 | Chlorobenzene | 82.0 | 15.0 | 70 | 135 |

The Applicant has shown, in Tale 1 above, that a preferred % vl concentration of the cross linking reagent in the microcapsule is in the range of 5% to 80% more preferably 40% to 65%. It has been shown, FIG. 4, that at concentrations above 80% vl are weak and are likely to rupture prematurely. Clearly whilst concentrations below 10% vlare robust, there use would require large volumes of microcapsules to be used to deliver a fixed volume of cross linking reagent.

Surfactant Concentration

It was further found that increasing agitation rate and surfactant concentration gave smaller more uniformly sized microcapsules. Increasing the concentration of shell wall precursor and chain extender led to stronger microcapsules. Further, an increase in reaction time and temperature increased the thickness of the microcapsule's shell wall polymer, thus giving stronger microcapsules.

The role of the surfactant in microcapsule synthesis is to aid the formation of a stable emulsion, working by reducing the surface tension at the oil-water interface.

Microcapsules were synthesised using a range of different concentrations of gum arabic—5, 10, 15, 20 and 25 wt. % in $H_2O$ whilst maintaining a constant agitation rate of 1000 rpm. The generated microcapsules were measured using optical microscopy revealing, as expected, increasing the surfactant concentration generated smaller more uniform microcapsules (FIG. 3). Although only a small amount of surfactant concentration is required to form a stable emulsion <1 wt. % reducing the surfactant concentration below 5 wt. % did not lead to the formation of microcapsules.

Shell Wall Precursor Concentration

Microcapsules were synthesised using several concentrations of shell wall precursor—13, 23, 35, 52 and 68 wt. %. The shell wall thickness of the yielded microcapsules was measured using SEM following preparation of cross-sections using a microtome. As the concentration of the shell wall precursor was increased an increase in the average shell wall thickness was observed. Although only a small increase in the shell wall thickness was observed, this led to a significant increase in the microcapsules mechanical strength, which provides mechanically robust microcapsules, which may mitigate against rupturing during mechanical mixing with binder and filler reagents, especially energetic materials.

Increasing encapsulant concentration was found to lead to an increase in the composition of the encapsulant in the microcapsule core.

Chain Extender Concentration

Long storage lifetimes of microcapsules containing IPDI is desirable, thus the longevity of microcapsules was investigated by measuring the core composition after 4 weeks and observing the leaching of IPDI from the core. It was found that a loss of 14 wt. % of IPDI was observed within this period of time. Microcapsules were synthesised using a range of concentrations of 1,4-butanediol—0.06, 0.28, 0.65, 0.94 and 1.14 mol dm-3. The surface morphology of all the afforded microcapsules was analysed using SEM revealing the formation of microcapsules that possessed smooth non-porous exterior shells. The leaching of IPDI from these microcapsules after a period of 4 weeks at a temperature of 20° C. was investigated by measuring the core composition after this period of time using $^1H$ NMR spectroscopy. The loss of IPDI from microcapsules was significantly reduced upon increasing the concentration of 1,4 butanediol, this may be attributed to the formation of a denser polyurethane shell wall.

Microcapsules Comprising Labile Linkage and Non-Labile Linkage Shell Wall Precursors.

| Labile linkage IX | non-labile linkage XII | Strength |
|---|---|---|
| 100% | 0% | Weak |
| 50% | 50% | Weak |
| 20% | 80% | Stronger |

It was found that using a mixture of shell wall precursors, improved the strength of the microcapsule wall. In the range of from 5 to 50% of thermally labile material for the microcapsule wall may lead to a suitable labile linkage The above labile linkage ruptures via a reversed Diels Alder reaction.

Rupture of Microcapsules

Microcapsules were mixed with hydroxy-terminated polybutadiene and applied onto a microscope slide. The microscope slide was mounted upon a hot stage and heated to 140° C. at a rate of 5° C. a minute. The release of the microcapsule core was observed with optical microscopy. The payload of the microcapsules was 0.44 g (44 wt %) of IPDI and 0.21 g (21 wt %) of chlorobenzene per 1 g of microcapsules. The rupturing of the microcapsule may be clearly seen in FIG. 3.

Delayed Cure of HTPB Using Microencapsulated Cross-linkers

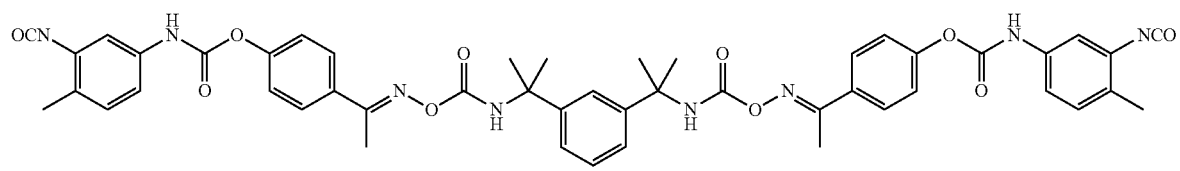

IV

The average shell wall thickness of the microcapsule synthesised as detailed above, using precursor IV, was 2.45 microns, with an average diameter 68 microns with a size distribution diameter range of 22-117 microns.

The generated microcapsules using IV for the controlled delivery of IPDI in HTPB using an external stimulus of heat was investigated. Microcapsules comprising IV were selected for this investigation because of their high mechanical strength and thus can withstand shear forces when mixed with HTPB.

A formulation of HTPB (100 mg), DBTDL (0.24 mg) and Microcapsules comprising IV (23 mg) were mixed together in a composition. As a control experiment, a second formulation comprised of HTPB (100 mg), DBTDL (0.24 mg) and microcapsules (18 mg) that do not possess thermally-labile linkages in the microcapsule shell wall was generated—designated herein as 'control microcapsules'. Both mixtures were placed between two films of cellulose acetate and heated to 150° C. for a period of 30 minutes followed by a further 24 hours at 60° C. Tensile testing was performed before and after heating and revealed that upon exposure to heat an increase in the tensile strength of both mixtures was observed, suggesting that IPDI had been released from both Microcapsules comprising IV and control microcapsules leading to the cure of HTPB. This characteristic could be exploited as a method of delivery of the microcapsule core.

It should be appreciated that the compositions of the invention are capable of being incorporated in the form of a variety of embodiments, only a few of which have been illustrated and described above.

An embodiment of the invention will now be described by way of example only and with reference to the accompanying drawings of which:

Figure 1:
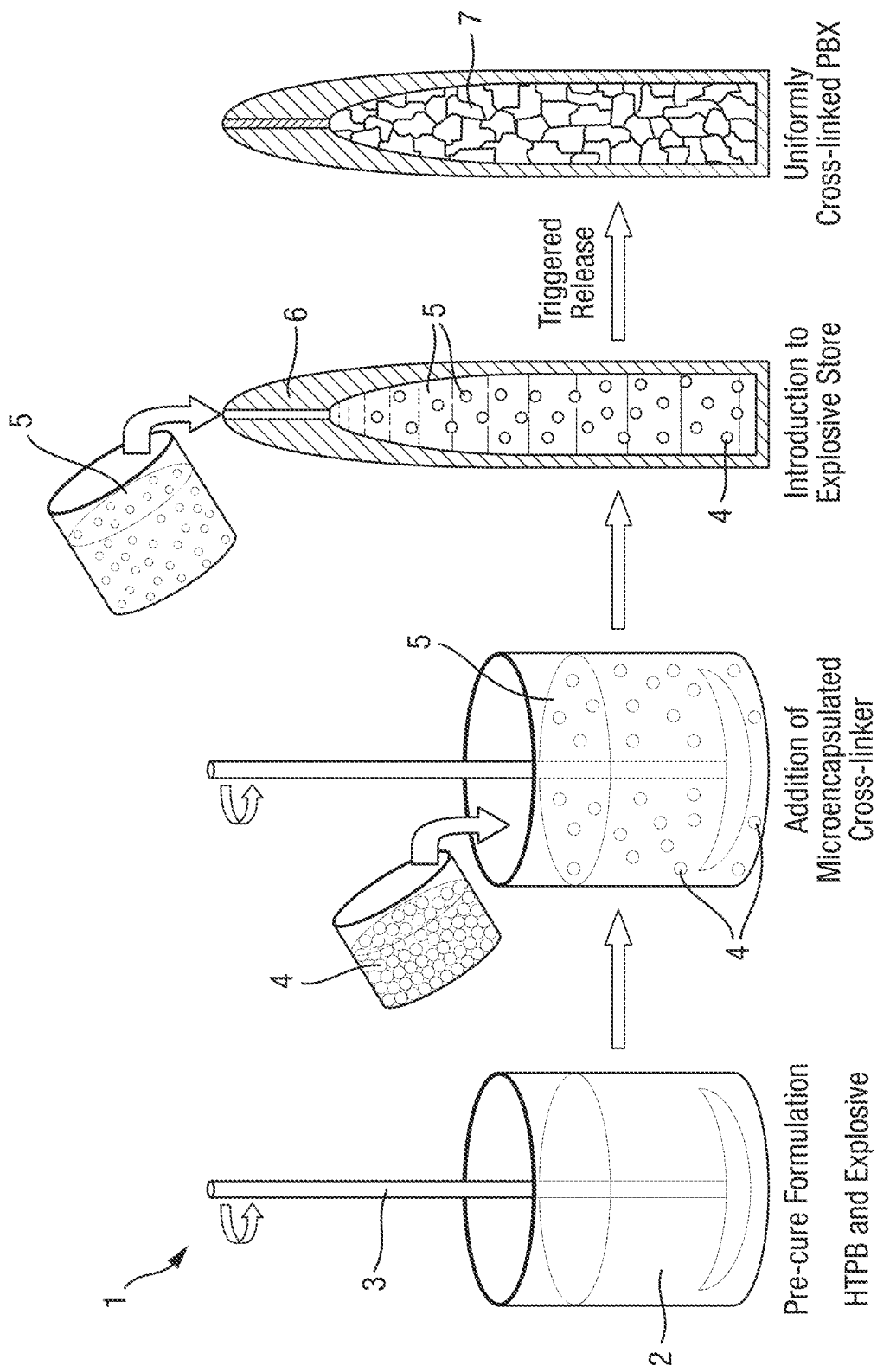
FIG. 1 shows a schematic of the fill of an HE ammunition process
Figure 4:
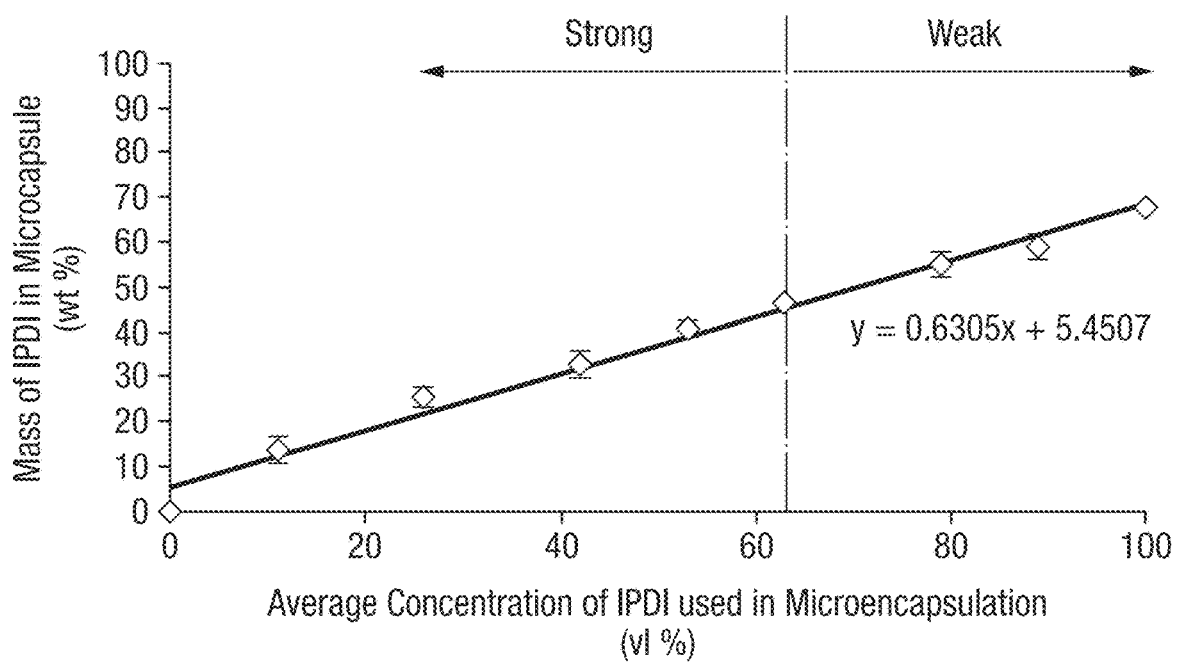
Figure 3:
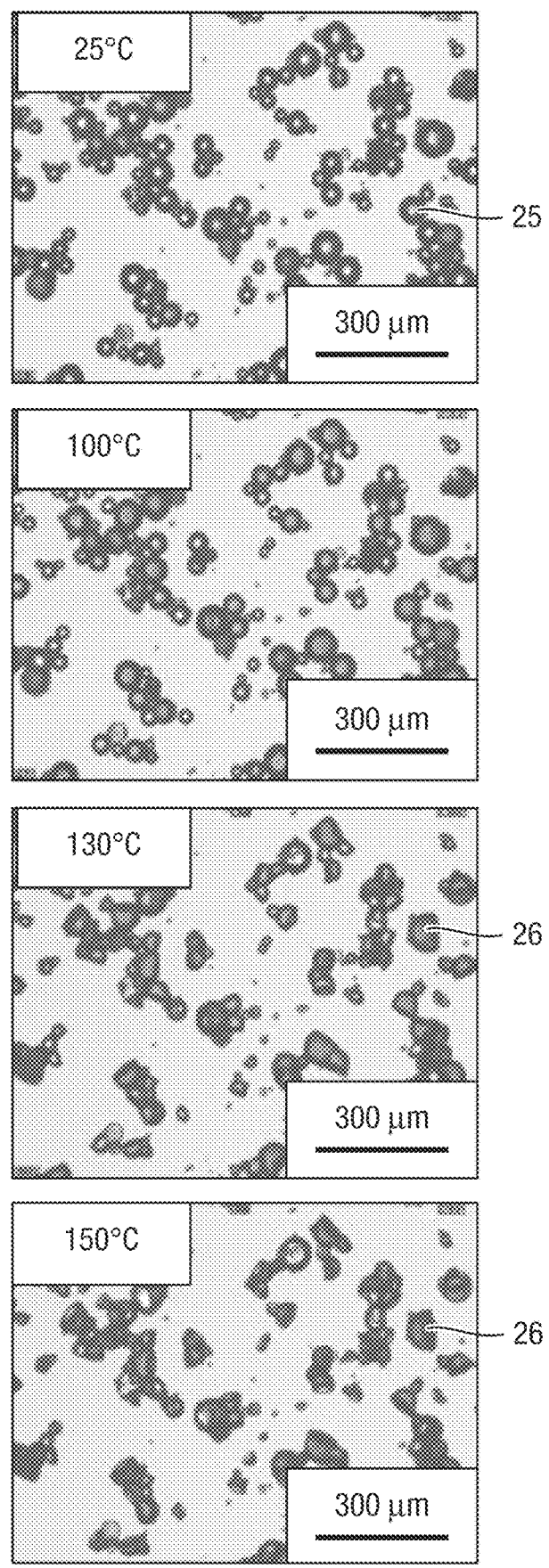

FIG. 3 shows the progression of the thermal rupture of a labile linkage microcapsule FIG. 4 shows a graph of concentration of and mass of IPDI in a microcapsule Turning to FIG. 1 there is a general scheme 1, for filling a munition 6. The premix formulation 2, is a mixture of the explosive, HTBP polymerisable binder and other processing aids, and optionally a catalyst. The premix formulation 2 is agitated such as by a stirrer 3. Microcapsules comprising a cross linking reagent 4, are added to the premix to form the precure formulation. The cross linking reagent (not shown) may be a diisocyanate such as IPDI. The resultant precure admixture 5 is thoroughly mixed and is transferred to a munition 6 or mould for later insertion into a munition(not shown). The munition 6 when filled with the precure 5 may then be exposed to an external stimuli, such as heat, which ruptures the microcapsules 4, causing release of the cross linking reagent. The cross linking reagent and HTPB polymerisable binder may then polymerise and form a polymer bonded explosive 7.

Figure 2:
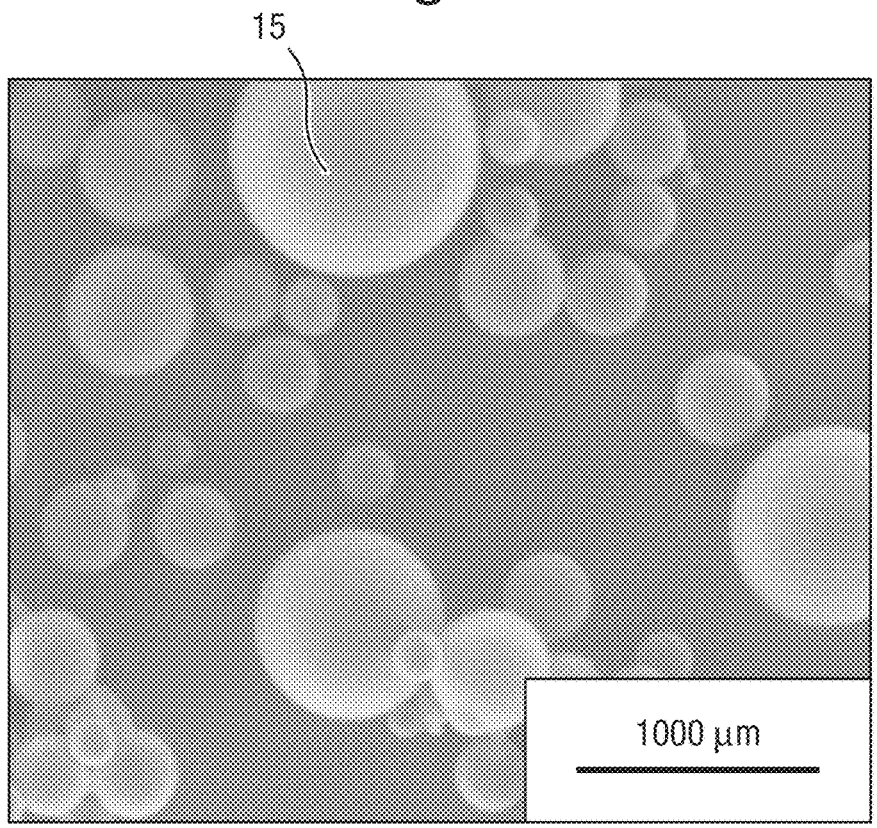
FIG. 2 shows an optically magnified microcapsule

Turning to FIG. 2, there is provided a microcapsule 15 comprising cross linking reagent. The size of the microcapsules may be readily controlled by selection of the agitation means. The rate of stirring may control diameter size.

Turning to FIG. 3 there is provided photographs at four temperatures. The microcapsules comprised shell wall precursor I. The microcapsules where then placed on a heated microscope stage and observed as the temperature increased. It is clear that form 25° C. to 100° C. that the microcapsules 25 are substantially intact. The stability at these temperatures is very desirable as it means during the mixing of the precure, as highlighted above, that the precure may be heated or if it experienced heating during the mixing of the precure (explosive, HTPB and microcapsules), that the microcapsules will remain intact, and there will be substantially no rupture or release of the cross linking reagent. As the temperature increases from 130° C. to 160° C., the ruptured microcapsules 26 may be observed, which allows the release of the cross linking reagent payload. The rupture at or around 160° C., is significantly below the +200° C. of the temperature that detonation may occur for the majority of the explosive materials.

Turning to FIG. 4, there is graph showing IPDI concentrate vl % vs wt %, which shows that there is a maximum achievable wt % of 60 wt %. The relative strength of the microcapsules were assessed, and it was found that the preferred vl % inclusion was less than 80% vl, more preferably between 40% vl and 65%, as at very high vl % amounts the shell wall polymer was too weak.

The invention claimed is:

1. A pre-cure castable explosive composition comprising an explosive material, a polymerisable binder, and a microencapsulated cross linking reagent, said microencapsulated cross linking reagent comprising a cross linking reagent encapsulated in a microcapsule, wherein the microcapsule includes a shell wall polymer comprising at least one labile linkage.

2. The composition according to claim 1, wherein the polymerisable binder is selected, such that it will form with the cross linking reagent one or more of: a polyurethane, a cellulosic material, a cellulose acetate, a polyester, a polybutadiene, a polyethylene, a polyisobutylene, a PVA, a chlorinated rubber, an epoxy resin, a two-pack polyurethane system, an alkyd/melanine, a vinyl resin, an alkyd, a butadiene-styrene block copolymer, a polyNIMMO, a polyGLYN, a GAP, and a blend, copolymer and/or combination thereof.

3. The composition according to claim 1, wherein the explosive material is selected from RDX, HMX, FOX-7, TATND, HNS, TATB, NTO, HNIW, GUDN, picrite, aromatic nitramines such as tetryl, ethylene dinitramine, nitroglycerine, butane triol trinitrate, pentaerythritol tetranitrate, DNAN trinitrotoluene, an inorganic oxidiser, ADN, ammonium perchlorate, an energetic alkali metal salt, an energetic alkaline earth metal salt, and combinations thereof.

4. The composition according to claim 1, wherein the microcapsule comprises a shell wall polymer selected from polyurethane, cellulose acetate, a polyester, a polybutadiene, a polyethylene, a polyisobutylene, PVA, chlorinated rubber, an epoxy resin, a two-pack polyurethane system, an alkyd/melanine, a vinyl resin, an alkyd, a butadiene-styrene block copolymer, polyNIMMO, polyGLYN, GAP, and blends, copolymers and/or combinations thereof.

5. The composition according to claim 4, wherein the microcapsule shell wall polymer and the polymerisable binder are selected from substantially the same polymer.

6. The composition according to claim 1, wherein the at least one labile linkage is a thermally labile linkage.

7. The composition according to claim 1, wherein the labile linkage is selected from an acetal, a blocked isocyanate, and a diels alder linkage.

8. The composition according to claim 7 wherein the blocked isocyanate is selected from an aromatic heterocycle, a secondary amine, a substituted phenol, an oxime, and an amide.

9. An organic microcapsule shell suitable for encapsulating an organic payload reagent, wherein the microcapsule shell comprises a shell wall polymer, said shell wall polymer comprising at least one thermally labile linkage, wherein the thermally labile linkage comprises a blocked isocyanate of Formula X Formula X

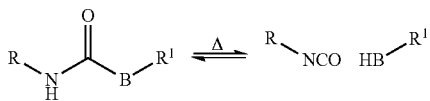

wherein R and R$^1$ are terminal end groups of a monomer or polymer forming the backbone of the microcapsule wall, and B is a reversible blocking group selected from an amide or phenol.

10. A process for making a munition with a homogenous cross linked polymer bonded explosive composition, the process comprising:
  forming an admixture of pre-cure castable explosive composition, said composition comprising an explosive material, a polymerisable binder, and a microencapsulated cross linking reagent, wherein the microencapsulated cross linking reagent comprises a cross linking reagent encapsulated in a microcapsule, wherein the microcapsule includes a shell wall polymer comprising at least one labile linkage;
  filling the munition with the admixture; and
  causing the microcapsule to release said cross linking reagent.

11. The process according to claim 10, further comprising causing the cure of said polymerisable binder to form a polymer bonded cast explosive composition.

12. The process according to claim 10, wherein the at least one labile linkage includes a thermally labile linkage.

13. The process according to claim 10, wherein causing the microcapsule to release said cross linking includes applying at least one chemical stimulus and/or physical stimulus.

14. A munition comprising a cured polymer bonded explosive composition and ruptured microcapsules.

15. The composition according to claim 4, wherein the shell wall polymer comprises polyurethane, the explosive material comprises RDX, and the polymerizable binder comprises HTPB.

16. The composition according to claim 15, wherein the at least one labile linkage includes a thermally labile linkage.

17. The composition according to claim 16, wherein the thermally labile linkage comprises a blocked isocyanate of Formula X Formula X

wherein R and R$^1$ are terminal end groups of a monomer or polymer forming the backbone of the microcapsule wall, and B is a reversible blocking group oxime.

18. The composition according to claim 17, wherein at least one of R and R1 comprises a polyurethane.

19. The composition according to claim 18, wherein the cross linking reagent is a diisocyanate.

20. The composition according to claim 1, wherein thermal release of the labile linkage occurs at a temperature from 50° C. to 150° C., wherein the temperature is below an ignition temperature of the explosive material.

* * * * *